Sept. 4, 1928.
J. A. BISHOP
VALVE
Filed Feb. 7, 1925
1,683,153
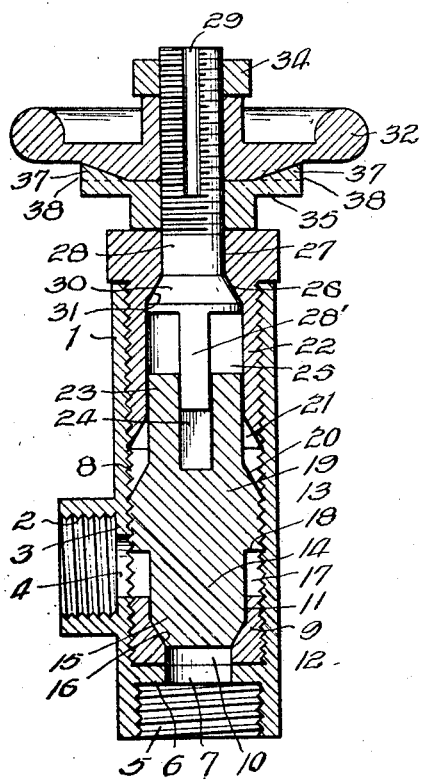
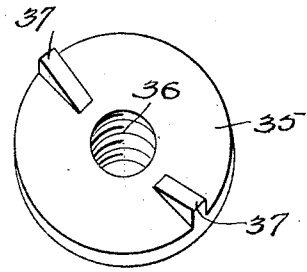
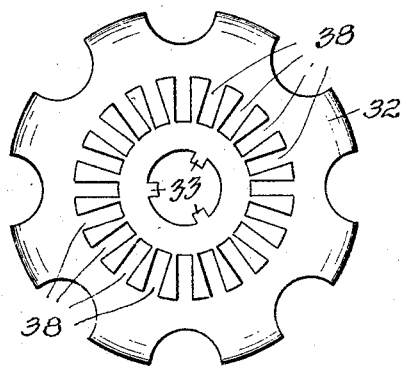
Inventor:
James A. Bishop.
By Fred'k Jharoon
Attorney.

Patented Sept. 4, 1928.

1,683,153

UNITED STATES PATENT OFFICE.

JAMES A. BISHOP, OF MASCOUTAH, ILLINOIS; LULU H. BISHOP ADMINISTRATRIX OF SAID JAMES A. BISHOP, DECEASED.

VALVE.

Application filed February 7, 1925. Serial No. 7,501.

My invention relates to valves, and more particularly to high pressure valves having no packing or, in other words, a packless valve, and, it is a distinct and practical improvement to overcome certain practical objections to, and defects in, high pressure valves and particularly of the type shown in my U. S. Letters Patent Number 875,496, over which my present valve structure is an improvement.

The object of my present invention is to provide an all metal high pressure valve obviating all independent decomposable valve packings.

A further object of the invention is to provide a packless valve adapted for use with ammonia, steam, or water with or without alkali properties, water impregnated with sulphur, or with other fluids, both under high or low pressure.

A further object of the invention is to provide a valve which will positively prevent leakage under either high or low pressure.

A still further object of the invention is the provision of a spline and groove connection between two of the valve members to permit of a very fine adjustment of the valve stem shoulder with a co-acting seat so as to prevent leakage with low pressure steam and water, such as radiator valves and the like, where the assistance of high pressure is lacking to assist in perfecting a tight joint between the valve stem shoulder and its seat.

A still further object of the invention is the provision of a packless valve which possesses advantages in points of simplicity, efficiency, and, at the same time proves itself comparatively inexpensive in manufacture and especially in maintenance.

With the above and other objects in view, the invention consists in the novel features of construction, arrangement and combination of parts hereinafter more fully described and finally pointed out in the claim hereto appended.

Referring to the accompanying drawings forming a part of this specification, wherein like characters of reference denote similar parts throughout the several views:

Fig. 1, is a vertical sectional elevation of a valve embodying the features of my invention, with one of its elements in side elevation.

Fig. 2, is a perspective view of the adjusting nut and clutch plate.

Fig. 3, is a bottom elevation of the handle.

In carrying out the aim of my present invention, I have shown a suitable valve casing designated 1. This valve casing 1 is tubular and is provided near its lower end with a laterally directed internally screw threaded coupling socket 2 terminating at its inner end in an inner annular flange 3 provided with an outlet opening 4 of a diameter less than that of the coupling socket 2. The valve casing 1 is further provided at its lower end with an internally screw threaded coupling socket 5 terminating at its upper end in an inner annular flange 6 provided with an inlet opening 7 of a diameter less than that of the coupling socket 5. The remainder of the valve casing 1 above the internal flange 6 is provided with suitable internal screw threads to provide the screw threaded valve casing socket 8.

A suitable screw threaded seating disc 9 is positioned within the screw threaded valve casing socket 8 at its lowermost end. The lower face of the disc is in engagement with the upper face of the annular apertured flange 6 and the upper face thereof lies in a plane with the lowermost surface of the outlet opening 4 of the apertured flange 3. The seating disc 9 is provided with an opening 10 at its lower end which registers with the opening 7 of the internal casing flange 6 and it is of the same diameter as the flange opening 7. The seating disc is further provided with an opening 11 which is in axial alignment with the opening 10 thereof and the opening 11 is provided with a tapered or conical seating face 12.

A valve member is also positioned within the valve casing socket 8. The valve member is provided with a central externally screw threaded section 13. A seating section 14 of less diameter than the screw threaded section 13 of the valve member and of the same diameter as the opening 11 of the seating disc 9 is directed downwardly from the screw threaded valve member section 13 and has its lower end beveled, or tapered to provide a cone 15 having a seating face 16, which seating face 16 co-acts with the conical seating face 12 of the seating disc 9 so that when the valve member is in its lowermost position, as shown in Fig. 1, the seating face 16 of cone 15 will bear tightly against the seating face 12 of the seating disc 9 and provide a tight joint between the valve member and the seating disc 9. An annular space 17 is formed between the valve casing 1 and the seating section 14 of the valve member and between the upper face of the seating disc 9 and the lower flange face 18 of screw threaded section 13 of the valve member to establish communication with the inlet and outlet openings 7 and 4, respectively, when the valve member is in a raised position, so that the contacting faces 12 and 16 are out of engagement, as is manifest and evident from Fig. 1, of the drawing, although not shown in such open position. The upper end of the screw threaded section 13 of the valve member is beveled, or tapered to provide a cone 19 having the seating face 20, which seating face is adapted to co-act with a conical seating face 21 of an externally screw threaded stationary sleeve plug 22 positioned in the upper end of the screw threaded socket 8 of the valve casing 1, only when the valve member is raised to its uppermost position, which position is not shown in the drawing, but which is manifest and apparent from Fig. 1, of the drawings, so as to provide a tight joint between the screw threaded section 13 of the valve member and the screw threaded sleeve plug 22 when said valve member is in such uppermost position. The upper end of the cone section 20 of the valve member is provided with a cylindrical neck 23 which is directed upwardly a suitable distance therefrom and of substantially the same diameter as the seating section 14 and it is provided with a socket 24 extending from face to face thereof and open at its upper end.

The screw threaded sleeve plug 22 is provided with a central bore or socket 25 extending from the lower seating surface 21 to an upper conical seating surface 26 which seating surface terminates at its upper end in a non-screw threaded opening 27 smaller in diameter than the socket opening 25 thereof.

A valve stem 28 is receivable in the opening 27 of the sleeve plug 22 and is directed upwardly therethrough. The valve stem 28 is externally screw threaded and provided with a plurality of peripheral spline sockets 29 running longitudinally thereof. The lower end of the valve stem 28 is provided with a cone head 30 having the seating face 31, which face 31 co-acts at all times with conical seating face 26 of the sleeve plug 22 so that the contacting faces 26 and 31 will form a tight but rotatable joint between the cone head 30 of the valve stem 28 and the conical seat 26 of the sleeve plug, thus, with the contacting faces 20 and 21 of the valve stem section 13 and the sleeve plug 22, respectively, form a positive double guard and protection against any possible leakage or escape of steam, water, ammonia, gas or other fluids under pressure around the valve member section 13 when it is either in open or closed position, which pressure tends to maintain the threads of the valve member section 13 in close engagement with the screw threads of the casing 1 and to maintain the contacting faces 26 and 30 at all times whether the valve member section is open or closed, in tight contacting relation, thereby preventing possible leakage without gaskets around the valve stem.

The valve stem 28 is provided at its lower end with a downwardly directed flat finger 28' adapted for slidable or telescopic reception in the open sided socket 24 of the valve member 13 so that whenever the valve stem is turned in either direction by the handle 32 which is suitably fixed thereto, it will impart turning movement to the valve member, as is evident from Fig. 1. The handle 32 is fixed to the valve stem 28 by means of splines 33 and a securing nut 34.

Though it is manifest and evident from the drawings that high pressures insure against leakage around the valve stem due to the contacting faces 26 and 31, it may develop at times that with low pressure, such as when the valve is used for radiator or other service, the pressure may be too slight to hold the stem cone in positively leak tight engagement with its co-acting conical seat, and due to the fact that the valve stem cone can be held leak tight against its seat to provide a universal packless valve, I shall now describe the adjusting means I employ with each valve to positively insure against leakage around the valve stem whether the valve is used for low or high pressure service.

The adjusting means consists of a circular plate 35 having a central screw threaded opening 36 for the passage of the valve stem 28 and this plate is seated upon the top face of the sleeve plug 22, as shown in Fig. 1. The perimeter of the upper face of the plate is provided with a plurality of fixed lugs 37 and the valve stem carries three or more spline grooves 29.

The lower face of the handle 32 is provided with a multiplicity of radially directed lug grooves 38, twenty being shown, certain of which are adapted to receive the lugs 37, as is manifest, and, due to the large number of spline grooves, it is evident that a large number of locking adjustments may be made for each screw thread of the valve stem. For example, since there are three spline grooves upon the valve stem 29 and twenty lug grooves in the handle, it follows that sixty locking adjustments may be made upon each screw thread of the valve stem for regulating the contact of the contacting faces 31 and 26, and since number twenty or twenty four screw threads upon the valve stem is amply strong for strain upon it, provision is thus made for twelve hundred locking adjustments per linear inch of the valve stem, hence all possible requirements for bringing the contacting faces 26 and 31 to provide a tight joint are completely met to insure against leakage at the valve stem joint.

It is evident that while I have shown an angle type of valve, a straightway, or other pattern may be made.

From the foregoing description, it is evident that I provide a metallic packless valve which is simple in construction, comparatively inexpensive in manufacture and highly efficient for the purposes intended.

The many advantages of the herein described invention will readily suggest themselves to those skilled in the art to which it appertains.

I do not wish to be understood as having limited myself to the specific details of construction shown and described, but desire to have it understood that the invention I have shown in the drawings is merely illustrative as it is manifest that various minor changes may be made in the exact construction and particular arrangement of parts without departing from the spirit of my invention, hence I reserve the right to make any such changes, or modifications as may fairly fall within the scope of the appended claim when fairly construed.

What I claim is:

In a packless valve, a hollow internally screw threaded casing, an internal flange at the lower end of said casing, said casing having an inlet and outlet opening, a replaceable metallic member provided with an opening terminating upwardly in a tapered seating surface, said replaceable member having screw threaded engagement with said casing and engaging said flange, a valve member having a central section in screw threaded engagement with said casing, a lower section of less diameter than the central section to provide a space between the lower section and the casing, a seating face at the lower end of the lower section adapted for engagement with the seating surface of the replaceable member and a bifurcated cylindrical upper section of less diameter than said central section, a tapered seating surface at the upper end of said central section, a sleeve plug having screw threaded engagement with said casing and having its inner end provided with a tapered seating surface adapted to be engaged by the upper tapered seating surface of the central section of said valve member, the upper section of said valve member having telescopic connection with said sleeve plug, a valve stem having an inverted cone head receivable in said sleeve plug and extending upwardly therethrough, a coacting seating surface in said sleeve plug for said cone head, a flat tongue directed inwardly from said cone head and receivable in the bifurcation of the upper section of said valve member, a plate having screw threaded connection with said valve stem and engaging the upper outer face of the sleeve plug, spaced lugs on the upper face of said plate, a handle having a spline connection with said valve stem, a multiplicity of radial grooves formed in the lower face of the handle for adjustable connection with said lugs and a nut carried by said valve stem in contact with said handle.

In testimony whereof, I have hereunto signed my name to the specification.

JAMES A. BISHOP.